United States Patent
Jeong

(10) Patent No.: US 7,995,257 B2
(45) Date of Patent: Aug. 9, 2011

(54) HOLOGRAPHIC STORAGE MEDIUM, RECORDING AND/OR REPRODUCING APPARATUS, AND RECORDING AND/OR REPRODUCING METHOD

(75) Inventor: Taek-seong Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 761 days.

(21) Appl. No.: 11/961,080

(22) Filed: Dec. 20, 2007

(65) Prior Publication Data

US 2008/0239426 A1  Oct. 2, 2008

(30) Foreign Application Priority Data

Mar. 26, 2007 (KR) .................. 10-2007-0029365

(51) Int. Cl.
G03H 1/10 (2006.01)
G03H 1/28 (2006.01)
G03H 1/02 (2006.01)

(52) U.S. Cl. .................. 359/10; 359/24; 359/28
(58) Field of Classification Search .............. 359/24
See application file for complete search history.

(56) References Cited

U.S. PATENT DOCUMENTS

| 5,777,760 A | 7/1998 | Hays et al. |
| 6,844,949 B2 * | 1/2005 | Kim .............. 359/35 |
| 7,116,626 B1 | 10/2006 | Woods et al. |
| 7,154,645 B2 * | 12/2006 | Yasuda et al. ............ 359/11 |
| 2002/0008889 A1 | 1/2002 | Tanaka et al. |
| 2004/0240012 A1 | 12/2004 | Yasuda et al. |
| 2006/0126143 A1 | 6/2006 | Ezura et al. |

FOREIGN PATENT DOCUMENTS

| JP | 2000-089649 | 3/2000 |
| KR | 10-277944 | 1/2000 |
| KR | 10-2006-0061667 | 6/2006 |

OTHER PUBLICATIONS

International Search Report and Written Opinion issued in corresponding International Application No. PCT/KR2008/000348 dated Apr. 24, 2008.
European Search Report issued on May 25, 2010, in corresponding European Application No. 08704878.1 (3 pages).

* cited by examiner

*Primary Examiner* — Arnel C Lavarias
*Assistant Examiner* — Jade R Chwasz
(74) *Attorney, Agent, or Firm* — NSIP Law, PC

(57) ABSTRACT

A holographic storage medium includes a hologram including data recorded in a plurality of pages in a superimposed fashion by interference of a signal beam and a reference beam, and an additional page recorded between two adjacent pages in the plurality of pages, wherein a portion of the data is recorded to a region of the additional page having a relatively small selectivity compared to other regions of the additional page without recording on the other regions.

15 Claims, 5 Drawing Sheets

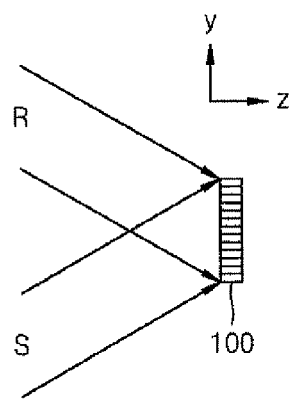
FIG. 1A
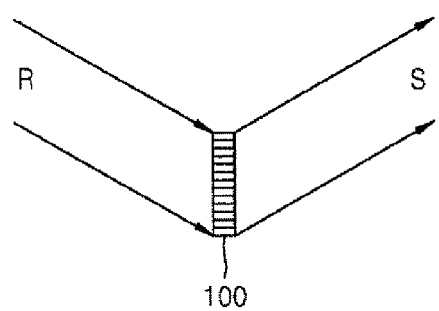
FIG. 1B
FIG. 2
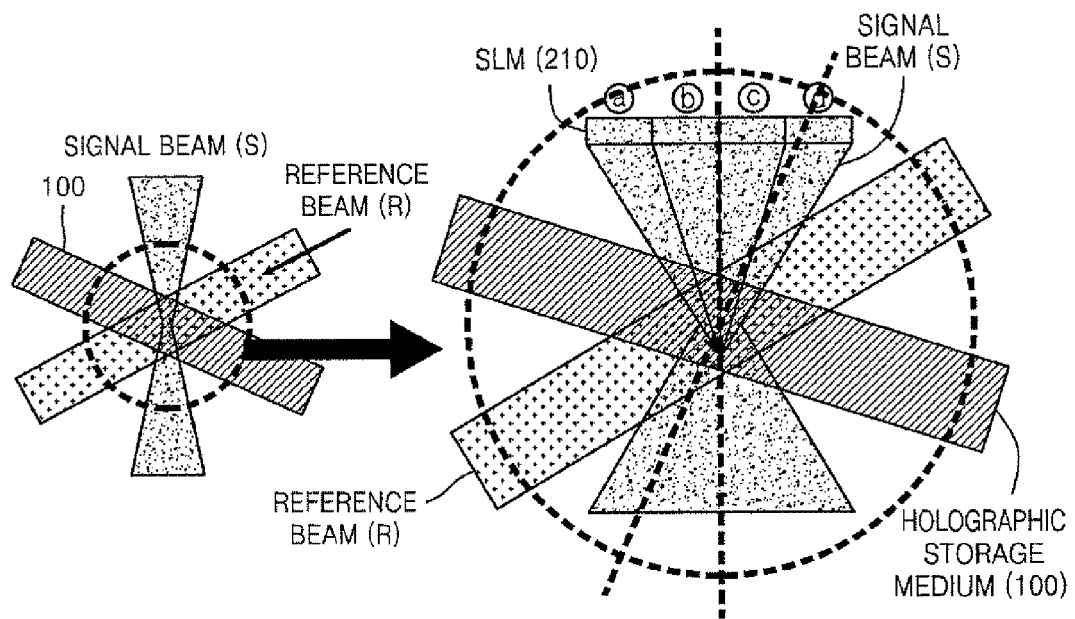

FIRST ANGLE

FIRST ANGLE+0.019

FIRST ANGLE+0.038

HOLOGRAPHIC STORAGE MEDIUM, RECORDING AND/OR REPRODUCING APPARATUS, AND RECORDING AND/OR REPRODUCING METHOD

CROSS-REFERENCE TO RELATED APPLICATION

This application claims the benefit of Korean Application No. 2007-29365, filed Mar. 26, 2007 in the Korean Intellectual Property Office, the disclosure of which is incorporated herein by reference.

BACKGROUND OF THE INVENTION

1. Field of the Invention

The following description relates to a holographic storage medium with an increased recording capacity, recording and/or reproducing apparatuses used with the holographic storage medium, and recording and/or reproducing methods used with the holographic storage medium.

2. Description of the Related Art

In optical holography, data is not stored on a surface of a recording medium, but is stored in a volume thereof. A signal beam interferes with a reference beam within the recording medium to generate a plurality of interference gratings referred to as a data page. The interference gratings change the optical characteristics of the reference beam, causing overlapping to occur. This process is referred to as multiplexing. When data is read from the recording medium, a single reference beam is incident on the recording medium under the same conditions as the conditions used during the data recording to generate a diffraction beam having the stored data page. The diffraction beam is detected by a detection array, which extracts a stored plurality of data bits from a measured intensity pattern. The data page contains the data bits, which are also referred to as pixels. As such, when the data pages overlap in the volume of the recording medium, data storage capacity is increased.

Referring to FIG. 1A, data is recorded to a holographic storage medium 100 using a signal beam S to carry the data and a reference beam R. During recording of the hologram 100, as illustrated in FIG. 1A, the reference beam R and the signal beam S interfere with each other to generate an interference pattern, which is transferred to the holographic storage medium 100. During reproduction of data from the holographic storage medium 100, as illustrated in FIG. 1B, the original reference beam R is radiated onto the recorded as a hologram on the holographic storage medium 100, and the recorded hologram recorded on the holographic storage medium 100 diffracts the reference beam to output the signal beam S. However, when the reference beam R used to reproduce data is different from an original beam used during the recording of data, the intensity or direction of a reproduced beam is different from the intensity or direction of the original recorded beam. Generally, as such a difference increases, the intensity of radiation is reduced by a shape defined by a sinc function.

FIG. 2 is a view illustrating angles according to regions of a signal beam S when data is recorded on the holographic storage medium 100. Referring to FIG. 2, the signal beam S and a reference beam R are incident on the holographic storage medium 100. The signal beam S is modulated by an optical modulator, such as a spatial light modulator (SLM) 210, and focused in a shape of a page on the holographic storage medium 100. The SLM 210 has a surface with a flat shape. Angles of the signal beam S incident on the holographic storage medium 100 are different according to regions of the SLM 210. The SLM 210 is classified into a, b, a and d regions illustrated in FIG. 2 along a scanning direction of the reference beam R. An incidence angle and selectivity (i.e., a Bragg selectivity angle) of the signal beam S of each region may be calculated. The results are shown in Table 1.

TABLE 1

|  | region a | region b | region c | region d |
|---|---|---|---|---|
| incidence angle of signal beam S (°) | 35.86 | 28.62 | 21.38 | 14.14 |
| selectivity (°) | 0.11 | 0.12 | 0.14 | 0.16 |

The incidence angle, at which the signal beam S is incident on the holographic storage medium 100, is an angle of the signal beam S with respect to a normal direction of the holographic storage medium 100 (i.e., a direction perpendicular to a recording surface of the holographic storage medium 100). The incidence angle is 35.86° in a region "a" of the SLM, 28.62° in a region "b," 21.38° in a region "c," and 14.14° in a region "d." Thus, there is an angle difference of about 7.24° between adjacent regions. This angle difference is used because the signal beam S passes through an objective lens (not shown) having a numerical aperture (NA) before the signal beam S is incident on the holographic storage medium 100.

When a beam is incident at an angle greater than a predetermined angle with respect to the central axis, the beam is refracted outwards. The NA of the objective lens is proportional to a sine of the predetermined angle. When the beam is incident on the objective lens at an angle less than or equal to the predetermined angle, the beam is not refracted outwards, and instead is totally reflected so as to be spread within the objective lens. When the selectivity of the signal beam S of each region is calculated, the smaller the incidence angle is, the greater the selectivity is. That is, the selectivity of the signal beam S varies according to the region of the SLM. Generally, high selectivity is desirable in order to reduce crosstalk. However, as the selectivity is increased, the incidence angle at which data can be recorded is decreased, preventing high density recording and multiplexing of data to the holographic storage medium 100.

FIG. 3 is a view illustrating the case where a page 300 is divided into regions. Referring to FIG. 3, a signal beam S is modulated by the SLM 210 to have a shape of the page 300 and is divided into A, B, C and D regions along a scanning direction of a reference beam R. FIG. 4 is a graph illustrating the selectivity measured in the regions A, B, C, and D illustrated in FIG. 3. Referring to FIG. 4, the selectivity varies according to the region, similar to the results shown in Table 1. Thus, crosstalk values are different according to the region of the page 300. Maximum selectivity is selected and a recording interval is determined based on the selected maximum selectivity in order to minimize crosstalk between pages. As a result, realization of high density data recording is difficult.

SUMMARY OF THE INVENTION

The following description is related to a holographic storage medium with an increased recording capacity, recording and/or reproducing apparatuses to be used with the holographic storage medium, and recording and/or reproducing methods to be used with the holographic storage medium.

In one general aspect, a holographic storage medium in which a hologram including data is recorded by interference of a signal beam and a reference beam includes a plurality of pages on which the data is recorded in a superimposed fashion, and an additional page recorded between two adjacent pages in the plurality of pages. A portion of the data is recorded to a region of the additional page having a relatively small selectivity compared to other regions of the additional page without recording on the other regions.

The medium may further provide that a size of the additional page is different from a size of each of the two adjacent pages.

The medium may further provide that a signal construction of the additional page is the same as a partial signal construction of each of the two adjacent pages, or is different from the partial signal construction of each of the two adjacent pages.

The medium may further provide that the data recorded on the two adjacent pages includes user data, and the portion of data recorded on the additional page includes additional information other than the user data.

In another aspect, a holographic storage medium in which a hologram including data which is recorded by interference of a signal beam and a reference beam includes a book comprising a first page and a second page which each include data and which are recorded to have a maximum selectivity based on the first page, and a third page having a smaller selectivity than the maximum selectivity recorded between the first page and the second page.

The medium may further provide that a portion of the data is recorded to the third page and is positioned on a region of the third page having a relatively small selectivity compared to other regions of the third page and is not recorded to the other regions.

In another aspect, a holographic storage medium recording apparatus to record data on a holographic storage medium includes a light processing unit to record data by interference of a signal beam and a reference beam on a plurality of pages on the holographic storage medium in a superimposed fashion, and a control unit to control the light processing unit so that an additional page is recorded between two adjacent pages in the plurality of pages. A portion of the data is recorded to a region of the additional page having a relatively small selectivity compared to other regions of the third page without recording on the other regions.

In another aspect, a holographic storage medium reproducing apparatus to reproduce data recorded to a plurality of pages on a holographic storage medium in a superimposed fashion by interference of a signal beam and a reference beam, includes a light processing unit to reproduce the data from the holographic storage medium; and a control unit to control the light processing unit to reproduce a portion of the data from an additional page recorded between two adjacent pages in the plurality of pages. The portion of the data is recorded on a region of the additional page having a relatively small selectivity compared to other regions of the additional page and is not recorded on the other regions.

In another aspect, a method of recording data on a holographic storage medium in which data is recorded in a superimposed fashion by interference of a signal beam and a reference beam on a plurality of pages includes recording a portion of the data to an additional page between two adjacent pages in the plurality of pages. The portion of the data is recorded on a region of the additional page having a relatively small selectivity compared to other regions of the additional page and is not recorded on the other regions.

In another aspect, a method of reproducing data from a holographic storage medium in which data is recorded on a plurality of pages in a superimposed fashion by interference of a signal beam and a reference beam includes reproducing a portion of the data from an additional page recorded between two adjacent pages in the plurality of pages. The portion of the data of the additional page is recorded on a region of the additional page having a relatively small selectivity compared to other regions of the additional page and is not recorded on the other regions.

Additional aspects and/or features will be set forth in part in the description which follows and, in part, will be obvious from the description, or may be learned by practice.

BRIEF DESCRIPTION OF THE DRAWINGS

These and/or other aspects and features will become apparent and more readily appreciated from the following description, taken in conjunction with the accompanying drawings of which:

FIGs. 1A and 1B illustrate examples of recording and reproducing operations in optical holography, respectively;

FIG. 2 is a view illustrating examples of angles according to regions of a signal beam when data is recorded on a holographic storage medium;

DETAILED DESCRIPTION OF THE EMBODIMENTS

Figure 3:
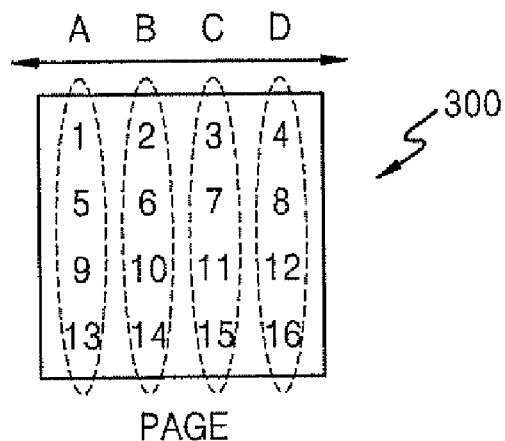
FIG. 3 is a view illustrating an example of the case where a page is divided into regions.
Figure 4:
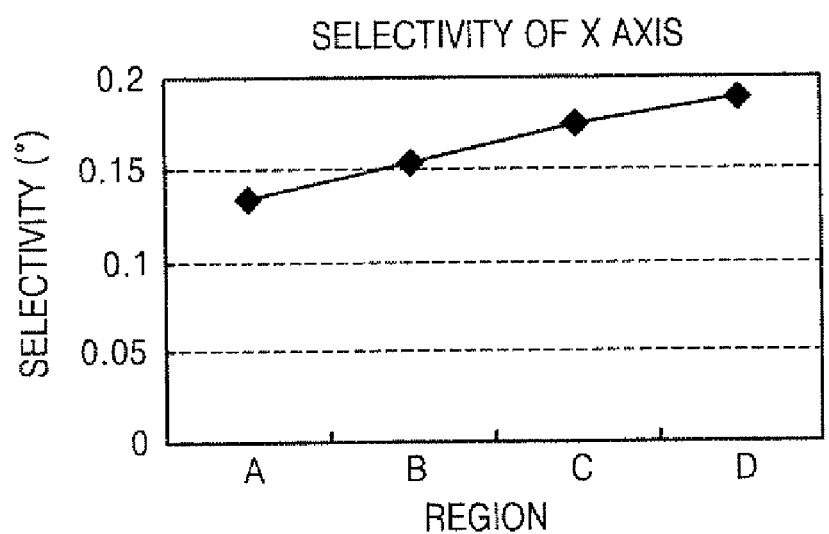
FIG. 4 is a graph illustrating an example of selectivity measured in the regions illustrated in FIG. 3.

Reference will now be made in detail to general embodiments, examples of which are illustrated in the accompanying drawings, wherein like reference numerals refer to the like elements throughout. General embodiments are described below by referring to the figures.

The following description is based on the principle that additional pages may be recorded onto a holographic storage medium without affecting crosstalk between original pages, in order to increase a recording capacity of the holographic storage medium without increasing the crosstalk. Specifically, pages having at least two kinds of sizes are recorded in a manner in which crosstalk is not generated. Thus, the recording capacity of the holographic storage medium is increased in a beneficial manner.

Figure 5A:
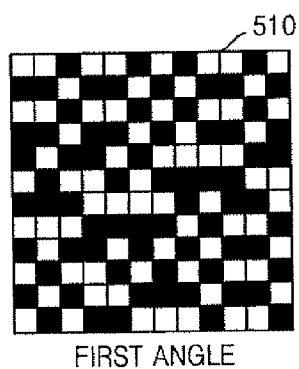
FIGS. 5A, 5B, and 5C are reference views illustrating an example of a recording method.

An example of a recording method will be described referring to FIGS. 5A, 5B, and 5C. In a conventional recording method, when selectivity is in the range of 0.1 degrees to 0.038 degrees according to each location of a page, pages are recorded in a superimposed fashion to be spaced at an angle of 0.038 degrees, which corresponds to a maximum selectivity for each page, in order to remove crosstalk between the pages. That is, when an original page 510, illustrated in FIG. 5A, is recorded at a first incident angle, another original page 530 illustrated in FIG. 5C which is adjacent to the original page 510 is recorded at the first incident angle+0.038 degrees. It is understood that selectivity may be in a different range than 0.1 degrees to 0.038 degrees in other aspects.

A general aspect of the recording method may provide that a page 520 is additionally inserted to be recorded between the two adjacent original pages 510 and 530. The page 520, which is inserted between the original adjacent pages 510 and 530, is referred to as an "additional page 520" or a "third page 520" and may be smaller, equal to, or larger than the two adjacent original pages 510 and 530. As shown, the additional page 520 is smaller than the original pages 510 and 530.

Figure 5B:
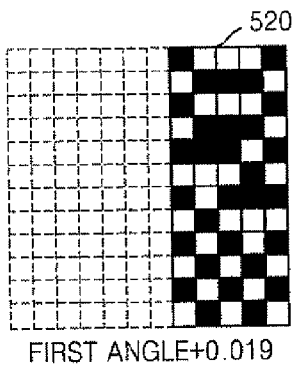
Figure 5C:
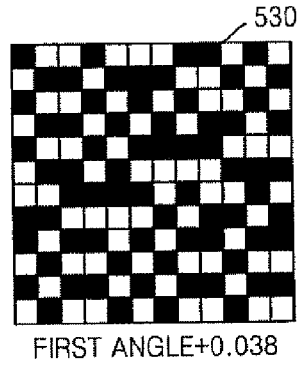

Referring to FIG. 5B, the additional page 520 is recorded at the first angle +0.019 degrees. The additional page 520 is recorded between the page 510, which is recorded at the first angle, and the page 530, which is recorded at the first angle +0.038 degrees. In other words, the additional page 520 is recorded at another angle which is half the angle of the angle separating the original adjacent pages 510 and 530. With reference to Table 1, such recording would be to regions (a) and (b) of the SLM 210, which therefore has the lower selectivity of 0.11 and 0.12 as compared to regions (c) and (d), which have selectivity of 0.14 and 0.16. Referring to FIG. 5B, the additional page 520 may be embodied to have a different size from the size of the original adjacent pages 510 and 530. Alternatively, the additional page 520 may be embodied to have the same size as the size of the original pages 510 and 530, but a region of the additional page 520 in which data is actually recorded should be smaller than regions of the original pages 510 and 530 in which data is recorded.

Data of the additional page 520 is positioned on a region having a relatively small selectivity compared to other regions in the entire additional page 520. Since the selectivity is small, the additional page 520 does not generate any substantial amount of crosstalk, and therefore does not affect the original adjacent pages 510 and 530. Accordingly, a signal does not deteriorate due to unnecessary crosstalk, and the recording capacity is increased in comparison to a conventional method. The size of the additional page 520, which is inserted between the original pages 510 and 530, may be determined according to the selectivity.

Figure 6:
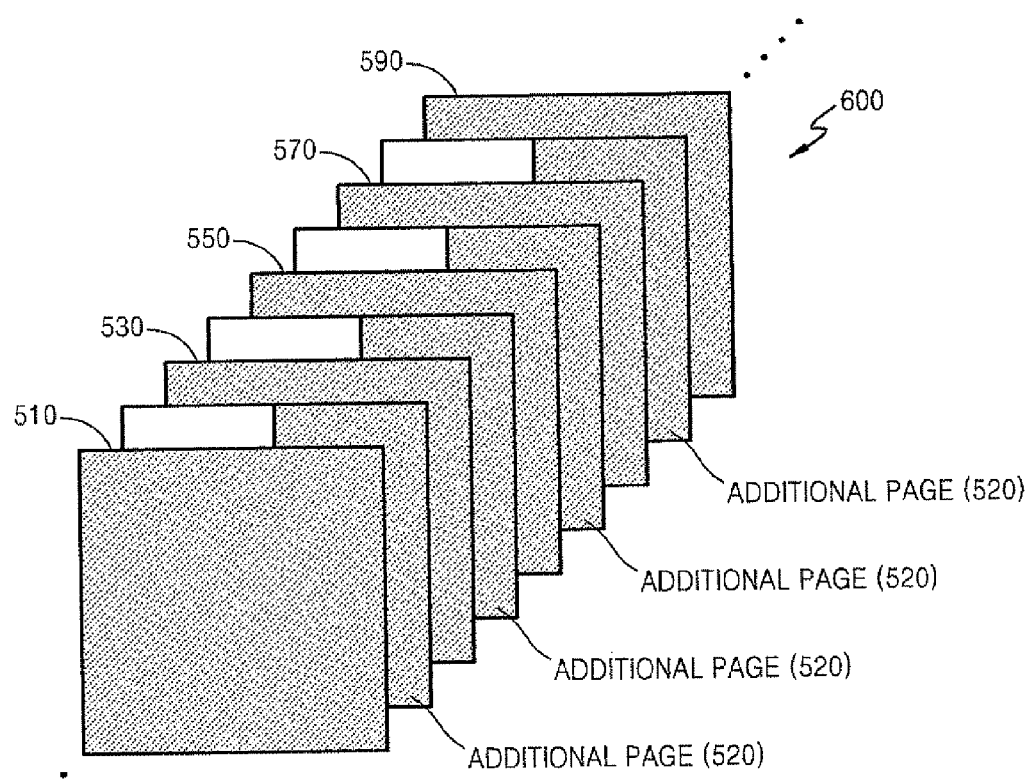
FIG. 6 is a view illustrating an example of a book in which a plurality of pages are recorded in a superimposed fashioner.

FIG. 6 is a view illustrating an example of a book 600 in which a plurality of pages are recorded in a superimposed fashion. In the book 600, an additional page 520 is inserted between each of the original pages 510, 530, 550, 570, and 590. It is understood that the book 600 may contain more or less pages than the number of pages illustrated in FIG. 6.

Referring to FIG. 6, for example, when a recording capacity of the additional page 520, in which data is to be recorded, is half of the recording capacity of an original page, for example, the original page 510, the recording capacity of data recorded by a recording apparatus to a holographic storage medium 200 is increased by about 50%. Furthermore, although FIG. 6 only illustrates one additional page 520 inserted between the original pages in FIG. 6, the book is not limited to this, and two or more additional pages 520 may be inserted between each pair of the original pages, for example, the original pages 510 and 530, without affecting crosstalk.

Figure 7:
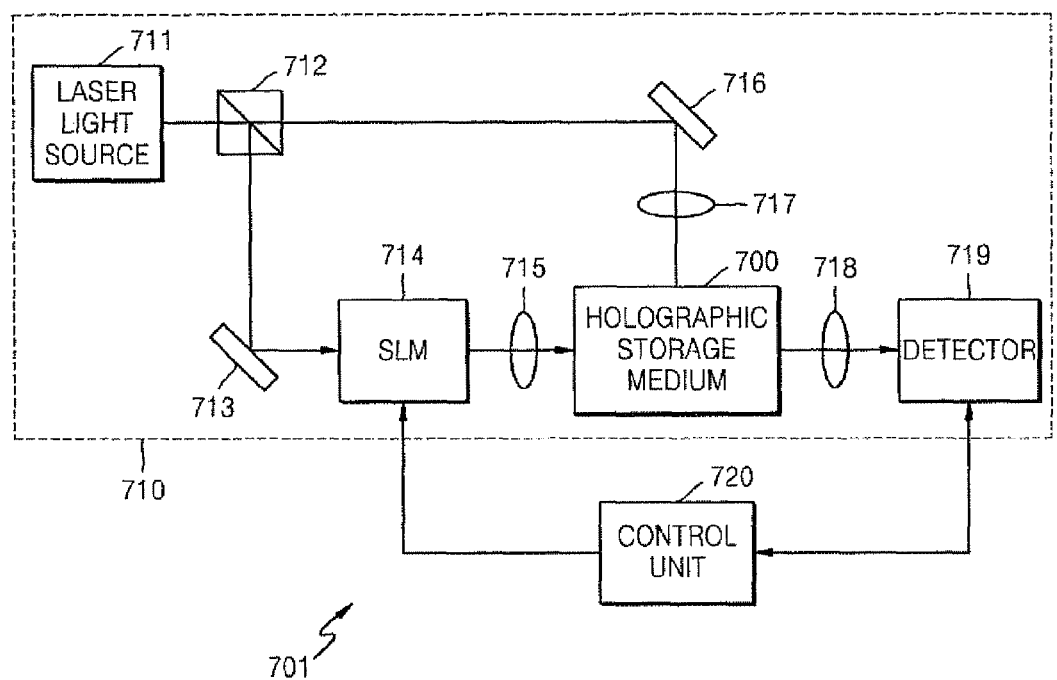
FIG. 7 is a block view illustrating an example a holographic storage medium recording and/or reproducing apparatus.

FIG. 7 is a block view illustrating an example of a holographic storage medium recording and/or reproducing apparatus 701. Referring to FIG. 7, the holographic storage medium recording apparatus 701 includes a light processing unit 710 into which a holographic storage medium 700 is inserted, and a control unit 720 to control the light processing unit 710 to record data on the holographic storage medium 700 and/or to reproduce data to and/or from the holographic storage medium 700.

The light processing unit 710 includes a laser light source 711, such as, for example, a semiconductor laser, a beam splitter 712, a first reflecting mirror 713, a spatial light modulator (SLM) 714, a first lens 715, a second reflecting mirror 716, a second lens 717, a third lens 718 and a detector 719. It is understood that the light processing unit 710 may include elements in addition to those described above and shown in FIG. 7, such as, for example, additional lenses, additional detectors, etc.

The control unit 720 controls the light processing unit 710. In addition, the control unit 720 generates a data page including recording data to transmit the data to the light processing unit 710, and data-processes a signal reproduced from the light processing unit 710. In particular, the control unit 720 controls the light processing unit 710 so that at least one additional page 520 having data recorded in a region with a relatively small selectivity may be recorded between two adjacent pages, such as the two adjacent pages 510 (FIG. 5(a)) and 530 (FIG. 5(c)). Referring back to FIG. 5, the control unit 720 controls the light processing unit 710 so that an angle of a reference beam R used to record an original page 510 may be set at a first angle, an angle of a reference beam R used to record the additional page 520 may be set at another angle equal to the first angle +0.019 degrees, and an angle of a reference beam R to record a page 530 may be set at the first angle +0.038 degrees. It is understood that the variation in degrees between each of the pages 510, 520, and 530 may be more or less than +0.019 degrees.

The control unit 720 controls the light processing unit 710 so that data is positioned on a region having a relatively small selectivity in the additional page 520, or alternatively, may control the light processing unit 710 so that the size of the additional page 520 is different from the size of the other pages 510 and 530. The apparatus may further provide that the control unit 720 positions the data on the region having a small selectivity in the additional page 520 using the method in which the size of the additional page 520 is the same as the size of the original pages 510 and 530, and controls the light processing unit 710 to position data on the region having a relatively small selectivity when the data is positioned on the additional page 520. In order to make the additional page 520 and the original page 510 have different sizes, the SLM 714 can be used to block light from part of the additional page 520, or a shutter (not shown) may be disposed in front of the SLM 714.

The control unit 720 controls the light processing unit 710 so that a signal construction of the additional page 520 may be the same as a partial signal construction of the page 510, or may be different from the signal construction of the page 510. In other words, a method of modulating data to be positioned on the additional page 520, or the ratio of bit 0 to bit 1 on the additional page 520, may be different from the method of modulating data to be positioned on the original page 510 or the ratio of bit 0 to bit 1 on the original page 510.

In addition, the control unit 720 may control the light processing unit 710 so that the original page 510 may be used to record user data, and the additional page 520 may be used to record additional information (i.e., non-user data and/or data used to manage the user data).

When data is recorded on the holographic storage medium 700, the laser light source 711 outputs a laser beam having coherent light. The laser beam is transmitted to be incident on the beam splitter 712, and is divided into a reference beam P and a signal beam S. The signal beam S is incident on the SLM 714. The signal beam S, which represents recording data and is incident on the SLM 714, is spatial-light modulated (amplitude modulated) by the SLM 714. The modulated signal beam S is focused on the holographic storage medium 700 by the first lens 715. Meanwhile, the reference beam R is reflected by the second reflecting mirror 716, and is incident on the holographic storage medium 700 after being focused by the second lens 717. Accordingly, interference fringes, which are generated by overlapping the signal beam S and the reference beam R, are recorded on the holographic storage medium 700 as a minute, dense pattern.

In order to reproduce data recorded on the holographic storage medium 700, an illumination beam (not shown), which is the same as the reference beam R used to record a data page that is to be reproduced, is transmitted to be incident on the holographic storage medium 700. Thus, data is reproduced as diffraction light beams corresponding to the interference fringes recorded on the holographic storage medium 700. Then, the diffraction light beams are focused onto the detector 719 by the third lens 718. The apparatus may further provide that the detector 719 may include one of a charge-coupled device (CCD) or a complementary metal-oxide semiconductor (CMOS). A regenerative signal is output from the detector 719 and is transferred to the control unit 720, at which point the data reproduction operation is complete.

The apparatus may further provide that, during the reproduction operation, the control unit 720 controls the light processing unit 710 to reproduce at least one additional page 520, which has data recorded to a region having a relatively small selectivity and is recorded between two adjacent original pages 510 and 530, from the holographic storage medium 700. As mentioned earlier, more than one additional page 520 may be recorded between the adjacent original pages 510 and 530.

Figure 8:
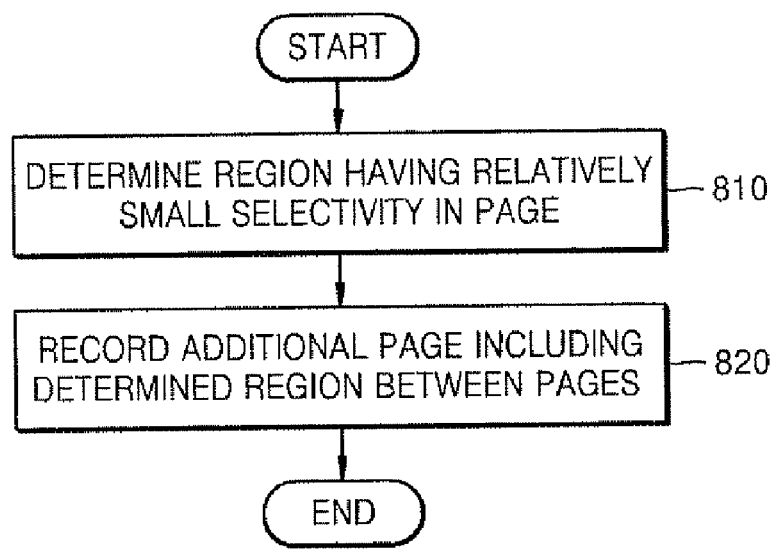
FIG. 8 is a flowchart illustrating an example of a recording method.

FIG. 8 is a flowchart illustrating an example of a method of recording data on a holographic storage medium 700. Referring to FIG. 8, a region having a relatively small selectivity in an original page 510 is determined at operation 810. An additional page 520 including the determined region is recorded between original pages 510 and 530 at operation 820.

Figure 9:
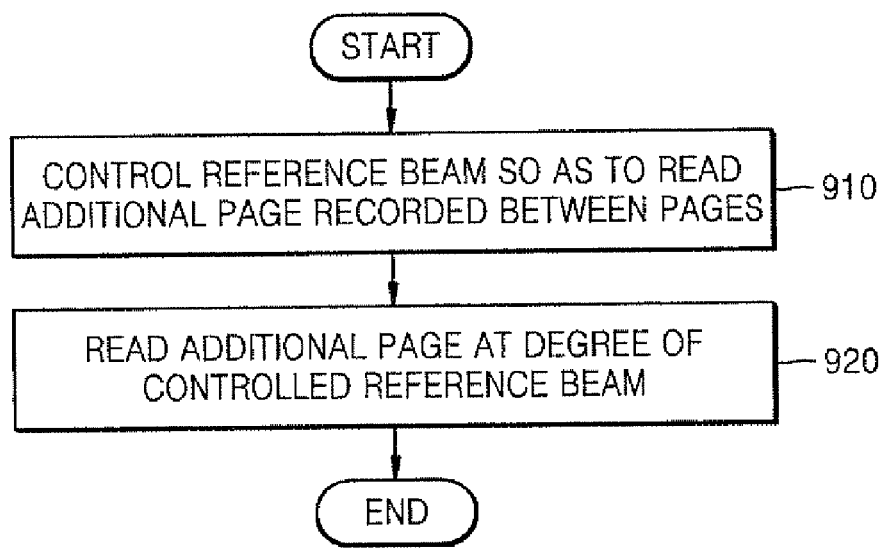
FIG. 9 is a flowchart illustrating an example of a reproducing method.

FIG. 9 is a flowchart illustrating an example of a method of reproducing data recorded on a holographic storage medium. Referring to FIG. 9, a reference beam is controlled so as to read an additional page 520 recorded between adjacent original pages 510 and 530 at operation 910. Next, the additional page 520 is reproduced at a predetermined degree of the controlled reference beam at operation 920.

The examples described herein can also be embodied as computer readable codes on a computer readable recording medium. The computer readable recording medium is any data storage device that can store data which can be thereafter read by a computer system. Examples of computer readable recording media include a read-only memory (ROM), a random-access memory (RAM), CD-ROMs, magnetic tapes, floppy disks, optical data storage devices, and a computer signal embodied in a carrier wave comprising a compression source code segment comprising the code and an encryption source code segment comprising the code (such as data transmission through the Internet). The computer readable recording medium can also be distributed over network coupled computer systems so that the computer readable code is stored and executed in a distributed fashion. A functional program, a code and a code segment to achieve the data recording and reproducing methods described above can be understood by one of ordinary skill in the art.

According to examples described herein, additional pages 520 are recorded without generating crosstalk between original pages 510 and 530 in a holographic storage medium 200. Thus, a holographic storage medium with an increased recording capacity is provided.

Although a few examples have been shown and described, it would be appreciated by those skilled in the art that changes may be made in the examples without departing from the principles and spirit of the examples, the scope of the examples being defined in the claims and their equivalents.

What is claimed is:

1. A holographic storage medium in which a hologram including data is recorded by interference of a signal beam and a reference beam, comprising:
   a plurality of pages on which the data is recorded in a superimposed fashion, the plurality of pages comprising first and second ones of the pages respectively recorded with the signal beam incident on the holographic storage medium at first and second incidence angles, a difference of the first and second incidence angles corresponding to a maximum selectivity of the first one of the pages and the second one of the pages; and
   an additional page recorded between the first one of the pages and the second one of the pages, the additional page being recorded with the signal beam incident on the holographic storage medium at a third incidence angle, the third incidence angle being between the first and second incidence angles, the additional page comprising:
   a first region in which data is recorded; and
   a second region in which data is not recorded, the first region having a selectivity that is less that a selectivity of the second region.

2. The holographic storage medium of claim 1, wherein a size of the additional page is different from a size of each of the first and second ones of the pages.

3. The holographic storage medium of claim 1, wherein a signal modulation used to record the additional page is the same as a signal modulation used to record the first and second ones of the pages.

4. The holographic storage medium of claim 1, wherein a signal modulation used to record the additional page is different from a signal modulation used to record the first and second ones of the pages.

5. The holographic storage medium of claim 1, wherein:
   the data recorded on the first and second ones of the pages comprises user data; and
   data recorded on the additional page comprises additional information other than the user data.

6. A method of recording data on a holographic storage medium in which data is recorded in a superimposed fashion by interference of a signal beam and a reference beam on a plurality of pages, the plurality of pages including first and second ones of the pages respectively recorded with the signal beam incident on the holographic storage medium at first and second incidence angles, the method comprising:
   recording data to an additional page between the first one of the pages and the second one of the pages, the data being recorded to the addition page with the signal beam incident on the holographic storage medium at a third incidence angle, the third incidence angle being between the first and second incidence angles, a difference between the first incidence angle and the second incidence angle corresponding to a maximum selectivity for the first and second ones of the pages, the recording of the data comprising recording the data in a first region of the additional page, the first region having a selectivity that is less than a selectivity of a second region in which the data is not recorded.

7. The method of claim 6, wherein a size of the additional page is different from a size of each of the first and second ones of the pages.

8. The method of claim 6, wherein a signal modulation used to record the additional page is the same as a signal modulation used to record the first and second ones of the pages.

9. The method of claim 6, wherein a signal modulation used to record the additional page is different from a signal modulation used to record the first and second ones of the pages.

10. The method of claim 6, wherein the recording comprises:
  recording user data on the first and second ones of the pages; and
  recording additional information other than the user data on the additional page.

11. A method of reproducing data from a holographic storage medium in which data is recorded on a plurality of pages in a superimposed fashion by interference of a signal beam and a reference beam, the method comprising:
  reproducing data from first and second ones of the pages respectively using an illumination beam incident on the holographic storage medium at first and second incidence angles, a difference between the first incidence angle and the second incidence angle corresponding to a maximum selectivity for the first and second ones of the pages; and
  reproducing data from an additional page recorded between the first and second ones of the pages using an illumination beam incident on the holographic storage medium at a third incidence angle, the additional page having a selectivity that is less than a maximum selectivity, the reproducing of the data from the addition page comprising reproducing data recorded in a first region of the additional page, the first region having a relatively small selectivity compared with a selectivity of a second region in which data is not recorded.

12. The method of claim 11, wherein a size of the additional page is different from a size of each of the first and second ones of the pages.

13. The method of claim 11, wherein a signal modulation used to record the additional page is the same as a signal modulation used to record the first and second ones of the pages.

14. The method of claim 11, wherein a signal modulation used to record the additional page is different from a signal modulation used to record the first and second ones of the pages.

15. The method of claim 11, wherein the reproducing comprises:
  recording user data on the first and second ones of the pages; and
  reproducing additional information other than the user data from the additional page.

* * * * *